United States Patent
Reilly et al.

(10) Patent No.: US 10,421,678 B2
(45) Date of Patent: Sep. 24, 2019

(54) MBR FRAME

(71) Applicant: Liberty Evans, LLC, Vancouver, WA (US)

(72) Inventors: James Philip Reilly, Vancouver, WA (US); Victoria Ann Jelderks, Vancouver, WA (US)

(73) Assignee: Liberty Evans, LLC, Seattle, WA (US)

( * ) Notice: Subject to any disclaimer, the term of this patent is extended or adjusted under 35 U.S.C. 154(b) by 0 days.

(21) Appl. No.: 15/816,301

(22) Filed: Nov. 17, 2017

(65) Prior Publication Data

US 2018/0141839 A1    May 24, 2018

Related U.S. Application Data

(63) Continuation of application No. 13/605,374, filed on Sep. 6, 2012, now Pat. No. 9,828,267.

(Continued)

(51) Int. Cl.
*C02F 3/00* (2006.01)
*C02F 3/02* (2006.01)
(Continued)

(52) U.S. Cl.
CPC ............. *C02F 3/02* (2013.01); *B01D 17/12* (2013.01); *B01D 21/30* (2013.01); *C02F 1/006* (2013.01); *C02F 3/00* (2013.01); *C02F 3/006* (2013.01); *C02F 3/04* (2013.01); *C02F 3/1268* (2013.01); *C02F 3/1273* (2013.01); *C02F 3/14* (2013.01); *B01D 35/00* (2013.01); *B01D 35/14* (2013.01); *C02F 3/06* (2013.01); *C02F 3/082* (2013.01); *C02F 3/302* (2013.01); *C02F 2001/007* (2013.01); *C02F 2203/006* (2013.01);
(Continued)

(58) Field of Classification Search
CPC .................................................... C02F 1/004
See application file for complete search history.

(56) References Cited

U.S. PATENT DOCUMENTS 3,772,193 A    11/1973   Nelli et al.
5,545,325 A    8/1996    Hsu et al.
(Continued)

OTHER PUBLICATIONS

"U.S. Appl. No. 13/605,365, Final Office Action dated Aug. 13, 2015", 15 Pgs.
(Continued)

*Primary Examiner* — Michael J Felton
*Assistant Examiner* — Katherine A Will
(74) *Attorney, Agent, or Firm* — Schwegman Lundberg & Woessner, P.A.

(57) ABSTRACT

Embodiments described methods, systems and apparatuses to utilize a plurality of membrane cartridges and a housing frame comprising a lightweight corrosion resistant material (e.g., non-corrosive metals, non-corrosive composites such as PVC, HDPE and FRP). The anti-corrosive properties of said frame allow of it to be re-used (e.g., with replaced MBR filters). Said MBR frame may be used in a single function or multi-function wastewater treatment container. Said container may also include a corrosion resistant liner coupled to interior portions of each of the base and side walls of the basin, an inlet to receive wastewater treatment influent into the basin, and an outlet to output wastewater treatment process material from the basin.

8 Claims, 8 Drawing Sheets

Related U.S. Application Data

(60) Provisional application No. 61/531,552, filed on Sep. 6, 2011.

(51) Int. Cl.

| | | |
|---|---|---|
| *C02F 3/12* | (2006.01) | |
| *C02F 3/04* | (2006.01) | |
| *C02F 3/14* | (2006.01) | |
| *B01D 17/12* | (2006.01) | |
| *B01D 21/30* | (2006.01) | |
| *C02F 1/00* | (2006.01) | |
| *B01D 35/00* | (2006.01) | |
| *B01D 35/14* | (2006.01) | |
| *C02F 3/06* | (2006.01) | |
| *C02F 3/08* | (2006.01) | |
| *C02F 3/30* | (2006.01) | |

(52) U.S. Cl.
CPC .... *C02F 2209/005* (2013.01); *C02F 2209/40* (2013.01); *Y02W 10/15* (2015.05)

(56) References Cited

U.S. PATENT DOCUMENTS

| | | | |
|---|---|---|---|
| 5,707,513 A | 1/1998 | Jowett et al. | |
| 6,086,758 A | 7/2000 | Schilling et al. | |
| 6,383,372 B1 | 5/2002 | Houck et al. | |
| 6,393,775 B1 | 5/2002 | Staschik | |
| 7,153,436 B2 | 12/2006 | Bair et al. | |
| 7,210,594 B2 | 5/2007 | Schütz | |
| 7,267,235 B2 | 9/2007 | Sharir | |
| 7,288,192 B2 * | 10/2007 | Jowett | C02F 3/04 210/220 |
| 7,666,285 B1 | 2/2010 | Cho et al. | |
| 9,669,330 B1 | 6/2017 | Reilly et al. | |
| 9,828,267 B1 | 11/2017 | Reilly et al. | |
| 2004/0074845 A1 | 4/2004 | Hagino et al. | |
| 2004/0084379 A1 | 5/2004 | Ballard | |
| 2004/0118764 A1 | 6/2004 | Miller et al. | |
| 2005/0150840 A1 | 7/2005 | Vion | |
| 2005/0241174 A1 | 11/2005 | Kolega et al. | |
| 2005/0247609 A1 | 11/2005 | Laing et al. | |
| 2006/0182100 A1 | 8/2006 | Li et al. | |
| 2006/0193467 A1 | 8/2006 | Levin | |
| 2007/0080112 A1 | 4/2007 | Langlais | |
| 2007/0187326 A1 | 8/2007 | Bonnelye et al. | |
| 2007/0215212 A1 | 9/2007 | Demeniuk | |
| 2007/0215531 A1 | 9/2007 | Wawrla et al. | |
| 2008/0104661 A1 | 5/2008 | Levin et al. | |
| 2008/0210093 A1 | 9/2008 | Snowdon | |
| 2009/0114592 A1 | 5/2009 | Lebrun et al. | |
| 2009/0211974 A1 | 8/2009 | Bonnelye et al. | |
| 2009/0236280 A1 * | 9/2009 | Morita | B01D 61/18 210/321.69 |
| 2009/0251529 A1 | 10/2009 | Tucker et al. | |
| 2009/0254670 A1 | 10/2009 | Kim et al. | |
| 2010/0032373 A1 | 2/2010 | Langlais | |
| 2010/0038314 A1 | 2/2010 | Vion et al. | |
| 2010/0200496 A1 | 8/2010 | Graveleau | |
| 2010/0282679 A1 | 11/2010 | Langlais | |
| 2011/0024358 A1 | 2/2011 | Pudvay | |
| 2011/0108497 A1 | 5/2011 | Stigebrandt | |
| 2011/0186512 A1 | 8/2011 | Bonnelye | |
| 2011/0290723 A1 | 12/2011 | Bonnelye et al. | |
| 2012/0055934 A1 | 3/2012 | Reilly et al. | |
| 2012/0111806 A1 | 5/2012 | Langlais et al. | |
| 2013/0001146 A1 | 1/2013 | Mirault | |
| 2013/0056404 A1 | 3/2013 | Malige et al. | |
| 2013/0118966 A1 | 5/2013 | Furuno et al. | |
| 2017/0113955 A1 | 4/2017 | Reilly et al. | |

OTHER PUBLICATIONS

"U.S. Appl. No. 13/605,365, Non Final Office Action dated Mar. 3, 2016", 20 pgs.

"U.S. Appl. No. 13/605,365, Non Final Office Action dated Dec. 5, 2014", 15 pgs.

"U.S. Appl. No. 13/605,365, Notice of Allowability dated Nov. 28, 2016", 11 pgs.

"U.S. Appl. No. 13/605,365, Notice of Allowance dated Nov. 15, 2016", 14 pgs.

"U.S. Appl. No. 13/605,365, Response filed Feb. 15, 2016 to Final Office Action dated Aug. 13, 2015", 11 pgs.

"U.S. Appl. No. 13/605,365, Response filed May 5, 2015 to Non Final Office Action dated Dec. 5, 2014", 11 pgs.

"U.S. Appl. No. 13/605,365, Response filed Aug. 3, 2016 to Non Final Office Action dated Mar. 3, 2016", 13 pgs.

"U.S. Appl. No. 13/605,365, Response filed Nov. 19, 2014 to Restriction Requirement dated Aug. 19, 2014", 6 pgs.

"U.S. Appl. No. 13/605,365, Restriction Requirement dated Aug. 19, 2014", 6 pgs.

"U.S. Appl. No. 13/605,374, Examiner Interview Summary dated Nov. 12, 2015", 3 pgs.

"U.S. Appl. No. 13/605,374, Final Office Action dated Feb. 16, 2016", 30 pgs.

"U.S. Appl. No. 13/605,374, Non Final Office Action dated Mar. 23, 2017", 14 pgs.

"U.S. Appl. No. 13/605,374, Non Final Office Action dated Jun. 18, 2015", 27 pgs.

"U.S. Appl. No. 13/605,374, Notice of Allowance dated Sep. 20, 2017", 7 pgs.

"U.S. Appl. No. 13/605,374, Response filed Jun. 9, 2017 to Non Final Office Action dated Mar. 23, 2017", 11 pgs.

"U.S. Appl. No. 13/605,374, Response filed Jul. 18, 2016 to Final Office Action dated Feb. 16, 2016", 12 pgs.

"U.S. Appl. No. 13/605,374, Response filed Nov. 6, 2015 to Non Final Office Action dated Jun. 18, 2015", 10 pgs.

"U.S. Appl. No. 13/605,382, Final Office Action dated Sep. 25, 2017", 21 pgs.

"U.S. Appl. No. 13/605,382, Final Office Action dated Nov. 16, 2016", 19 pgs.

"U.S. Appl. No. 13/605,382, Non Final Office Action dated Apr. 2, 2018", 19 pgs.

"U.S. Appl. No. 13/605,382, Non Final Office Action dated May 10, 2017", 19 pgs.

"U.S. Appl. No. 13/605,382, Non Final Office Action dated Jun. 29, 2016", 13 pgs.

"U.S. Appl. No. 13/605,382, Response filed Jan. 25, 2018 to Final Office Action dated Sep. 25, 2017", 13 pgs.

"U.S. Appl. No. 13/605,382, Response filed Mar. 16, 2017 to Final Office Action dated Nov. 16, 2016", 11 pgs.

"U.S. Appl. No. 13/605,382, Response filed Aug. 8, 2017 to Non Final Office Action dated May 10, 2017", 12 pgs.

"U.S. Appl. No. 13/605,382, Response filed Sep. 29, 2016 to Non Final Office Action dated Jun. 29, 2016", 9 pgs.

"U.S. Appl. No. 13/605,382, Response filed Oct. 1, 2015 to Restriction Requirement dated Jul. 2, 2015", 7 pgs.

"U.S. Appl. No. 13/605,382, Restriction Requirement dated Jul. 2, 2015", 8 pgs.

"U.S. Appl. No. 15/400,203, Preliminary Amendment filed Jan. 11, 2017", 6 pgs.

"U.S. Appl. No. 13/605,382, Notice of Allowance dated Oct. 15, 2018", 8 pgs.

"U.S. Appl. No. 13/605,382, Response filed Aug. 31, 2018 to Non Final Office Action dated Apr. 2, 2018", 14 pgs.

"U.S. Appl. No. 15/400,203, Restriction Requirement dated Nov. 26, 2018", 8 pgs.

U.S. Appl. No. 13/605,382, filed Sep. 6, 2012, Headworks and Dewatering.

U.S. Appl. No. 13/605,374 U.S. Pat. No. 9,828,267, filed Sep. 6, 2012, MBR Frame.

U.S. Appl. No. 13/605,365 U.S. Pat. No. 9,669,330, filed Sep. 6, 2012, WWTP Sensor Cartridge.

U.S. Appl. No. 15/400,203, filed Jan. 6, 2017, WWTP Sensor Cartridge.

* cited by examiner

MBR FRAME

CLAIM OF PRIORITY

This application is a continuation of U.S. application Ser. No. 13/605,374, filed Sep. 6, 2012, which claims priority to Provisional Application No. 61/531,552 filed on Sep. 6, 2011, each of which is hereby incorporated by reference in its entirety.

BACKGROUND

Membrane bioreactors (MBRs) are frequently used for treating wastewater. An MBR combines biological treatment processes with membrane filtration to provide organic and suspended solids removal. These systems typically provide an advanced level of nutrient removal. Membrane filtration processes provide high quality effluent to be transported through the membranes and generally function similarly to sedimentation and filtration processes. Because the need for sedimentation is eliminated, the biological process can operate at much higher mixed liquor suspended solids concentrations.

One type of conventional system includes at least one biological reactor and a membrane filtration tank disposed downstream from the reactor. A membrane module or cassette is typically submerged in the filtration tank. Mixed liquor is transferred from the reactor to the downstream filtration tank. The membrane module or cassette typically includes an array of submerged individual membrane filters. Mixed liquor is induced into the open space between the individual membrane filters, resulting in the mixed liquor being filtered and producing a permeate. The permeate is pumped or is flowing by gravity from the individual membrane filters and the filtration tank.

MBR systems are typically constructed out of stainless steel and membrane cartridges connected to a stainless steel manifold where water is pumped out of the cartridges via the manifold pipe connections to the cartridges. This solution is expensive and is designed for huge monolithic systems that are expected to handle a high volume of wastewater and stay fixed in one location for tens of years. Typically the cost of the MBR frame ranges in the 20-20% of the total cost of the MBR system.

DESCRIPTION OF DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of a method, apparatus and system of membrane bioreactor (MBR) housings and frames to be utilized in modular wastewater treatment plant (WWTP). In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In conventional MBR systems, a filtration tank is extremely large compared to the size of the membrane modules or cassettes. This means that when the membrane module or cassette is placed in the filtration tank, it is surrounded by mixed liquor or non-permeated mixed liquor. (i.e., mixed liquor in the filtration tank that has passed through the membrane module or modules in the filtration tank). The non-permeated mixed liquor in the filtration tank tends to be recirculated multiple times through the membrane module or cassette. That is, the mixed liquor or non-permeated mixed liquor tends to move upwardly through the membrane module and exits the top of the module and then returns downwardly outside of the module, and then is induced back upwardly through the membrane module. In large filtration tanks storing a high volume of wastewater, this means that the MBR frame housing the membrane modules needs to be relatively immovable (i.e., bolted to the floor) and sturdy (i.e., constructed from heavy, expensive corrosion resistant materials such as stainless steel). Embodiment MBR frame housings are utilized in modular wastewater treatment containers, and therefore are designed to be movable (e.g., for filter "hot-swapping" operations) and do not necessarily require the robust housings of prior art solutions.

Figure 1:
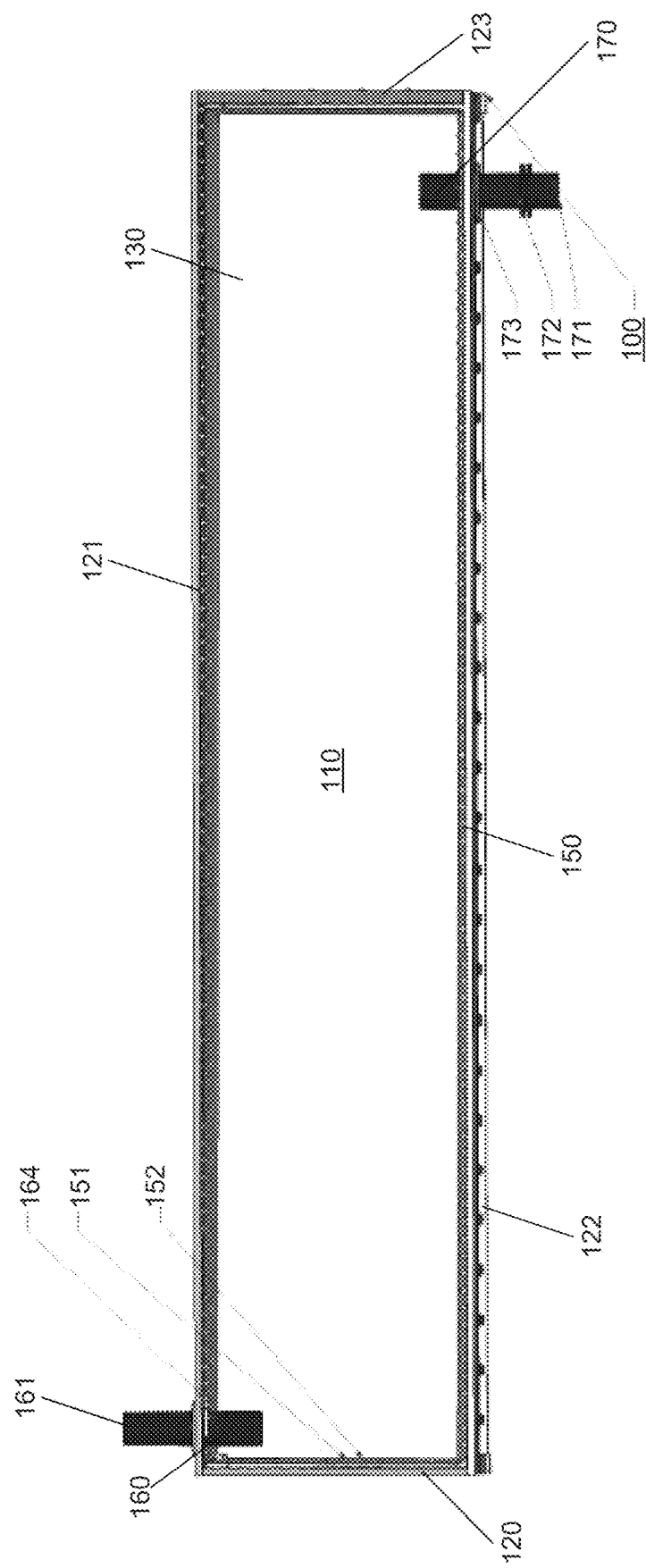
FIG. 1 is a top-view illustration of a modular wastewater treatment container according to an embodiment of the disclosure.

FIG. 1 is a top-view illustration of a modular wastewater treatment container according to an embodiment of the disclosure. In this embodiment, intermodal container 100 is consistent with any International Organization for Standardization (ISO) specification for intermodal containers (e.g., Technical Specification for Steel Dry Cargo Container, Spec.

No. ITRU-40'-SA, Jun. 12, 2001)—e.g., container 100 may be a steel dry cargo container ISO IAA type 40'×8'×8'6" or 20'×8'×8'6". In this embodiment, the interior of container 100 forms basin 110 (and thus, the terms "container" and "basin" is used interchangeably herein to describe a similar structure). In other embodiments, a wastewater treatment basin may be included in container 100, but said basin's shape and volume may be independent of the dimensions of container 100.

FIG. 1 illustrates container 100 from a "top view," thus illustrating side walls 120-123 and gravitational bottom (i.e., base) 130. It is to be understood that references to "side walls" and "gravitational bottom" are used simply to distinguish the sides of the containers of the example embodiment. In other embodiments of the invention, the orientation of a container including a wastewater treatment basin may be such that a different side of the container is the "gravitational bottom."

Lining portions of the interior of container 100 with a corrosion resistant liner may form a basin to hold wastewater process material. In this embodiment, basin 110 is formed by lining the interior of container 100 with corrosive resistant liner 150. Liner 150 may comprise at least one layer of polyvinyl chloride (PVC), Low Density Polyethylene (LDPE) or High Density Polyethylene (HDPE) liner. It is to be understood that utilizing an ISO container and said liner material to construct a wastewater treatment basin significantly reduces the costs of said basin compared to materials used in the prior art (e.g., concrete and stainless steel). In one embodiment, liner 150 may be coupled to steel grommets (such as grommet 151), which are further fastened to the steel hooks (such as hook 152) on the inside of container 100. The steel hooks may be welded to the inside of sidewalls 120-123 at the gravitational top of container 100.

Container 100 further includes inlet 160 and outlet 170. In this embodiment, inlet 160 and outlet 170 are two circular holes cut into container sidewalls 121 and 122, respectively, and the corresponding portions of liner 150 to accommodate inlet and outlet pipes 161 and 171. Thus, wastewater flows in and out of the basin 100 via pipes 161 and 171. The inlet and outlet pipes may be secured to sidewalls 121 and 122 of container 100 by welding flanged L shaped pipe rings (e.g., pipe ring 173) to the interior and exterior of said container sidewalls.

It is to be understood that in other embodiments, an inlet and an outlet for the basin may be any opening that allows wastewater treatment process material to enter and exit the basin. Furthermore, it is to be understood that the inlet/outlet of a basin may be a single access point of the basin (e.g., an exposed portion of a gravitational top of a basin may function as both an inlet and an outlet).

Inlet pipe 161 and outlet pipe 171 may each be an HDPE pipe. The HDPE pipes may be inserted into pipe rings and held in place in the pipe rings by attaching the HDPE flanges (e.g., flange 172) to the HDPE pipe using socket fusion welding. HDPE flanges may be attached to a flanged pipe ring (e.g., pipe ring 173) with screws which may be collectively underneath liner 150. The perimeter of inlet 160 and outlet 170 may be secured to their respective HDPE pipes using a rubber gasket and an aluminium fastener (e.g., fastener 164) on the interior side of liner 150.

Container 100 enables a modular design approach for a WWTP by subdividing said systems into smaller parts which may be easily manufactured and transported. For example, in the event increased capacity is desired, additional containers may be inexpensively added to meet the demand. Furthermore, WWTP components according to embodiments of the invention may be independently created and replaced, thereby reducing the labor and costs associated with lifetime maintenance of a WWTP.

In embodiments where container 100 is to include MBR filters (e.g., wherein container 100 is a single function WWTP container, or a multi-function WWTP container as described below), prior stainless steel frames cannot be easily secured inside an ISO based WWTP container that utilizes a liner (e.g., HDPE liner) for basin water integrity. Because of the massive weight for stainless steel, prior art MBR frames typically require anchoring to the floor of a steel or concrete basin. There is no cost effective and failsafe method of securing the steel container through an HDPE or other plastic liner (e.g., said stainless steel MBR frame would easily tear through the HDPE liner if it is at all moved from its affixed position).

Figure 2:
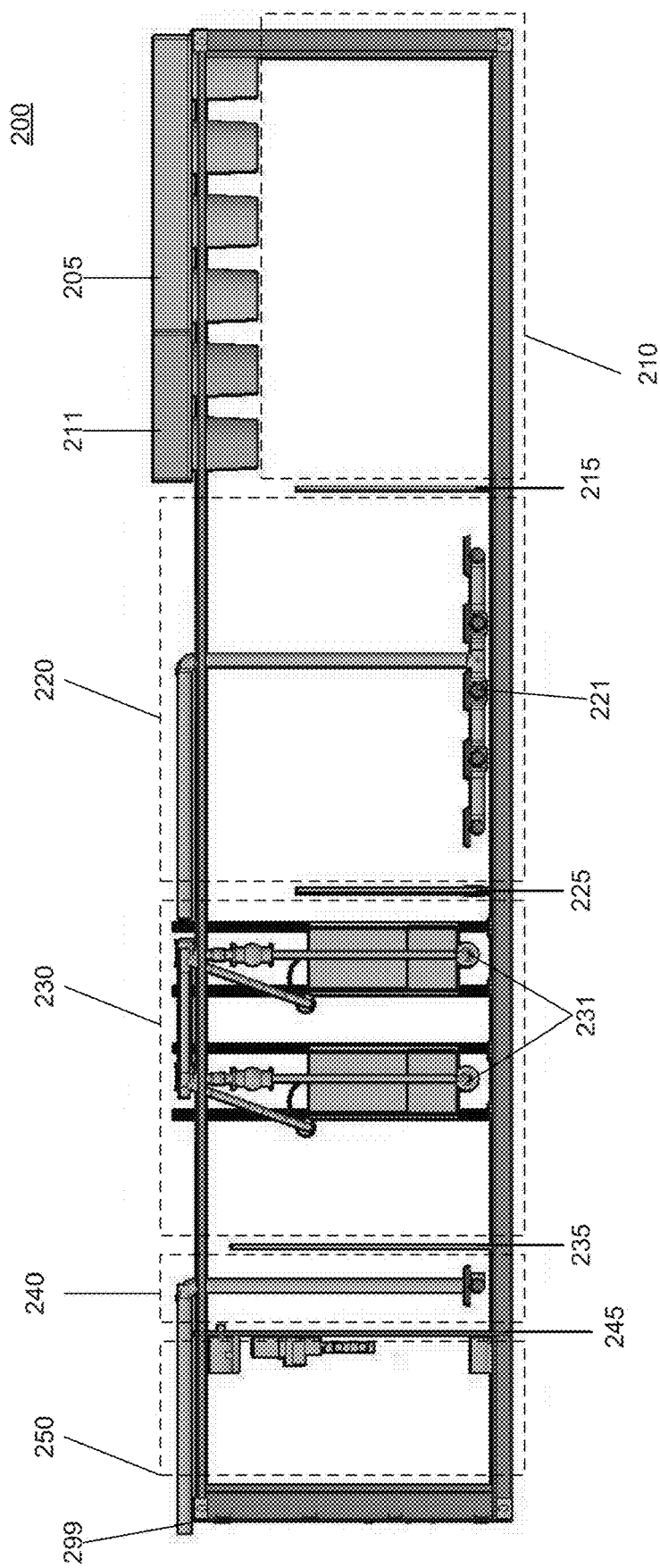
FIG. 2 is a block diagram of a dynamically configurable and controllable wastewater treatment container having a plurality of basin compartments according to an embodiment of the disclosure.
Figure 3A:
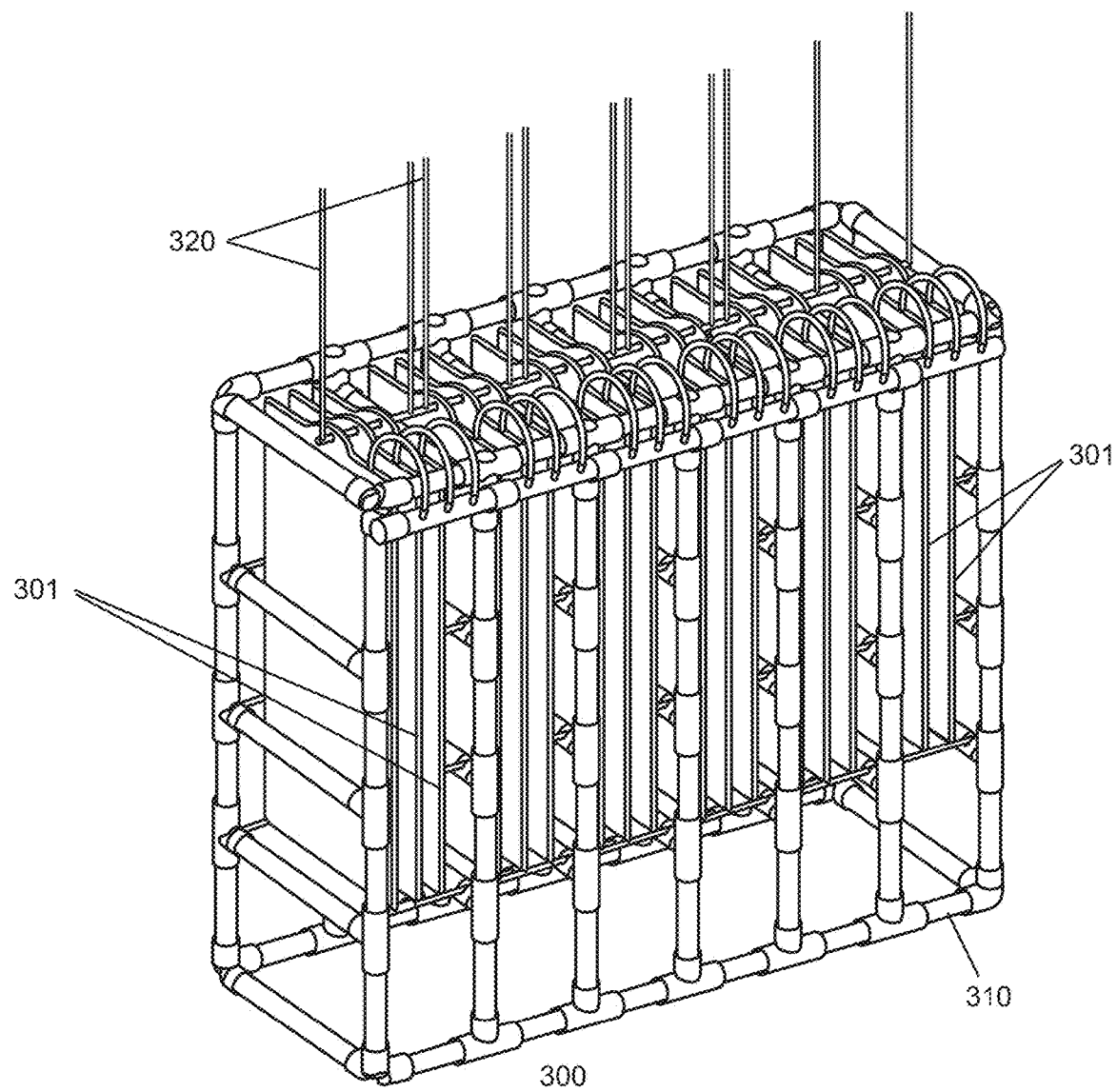
FIG. 3A-FIG. 3D illustrate MBR frames according to embodiments of the disclosure.
Figure 3B:
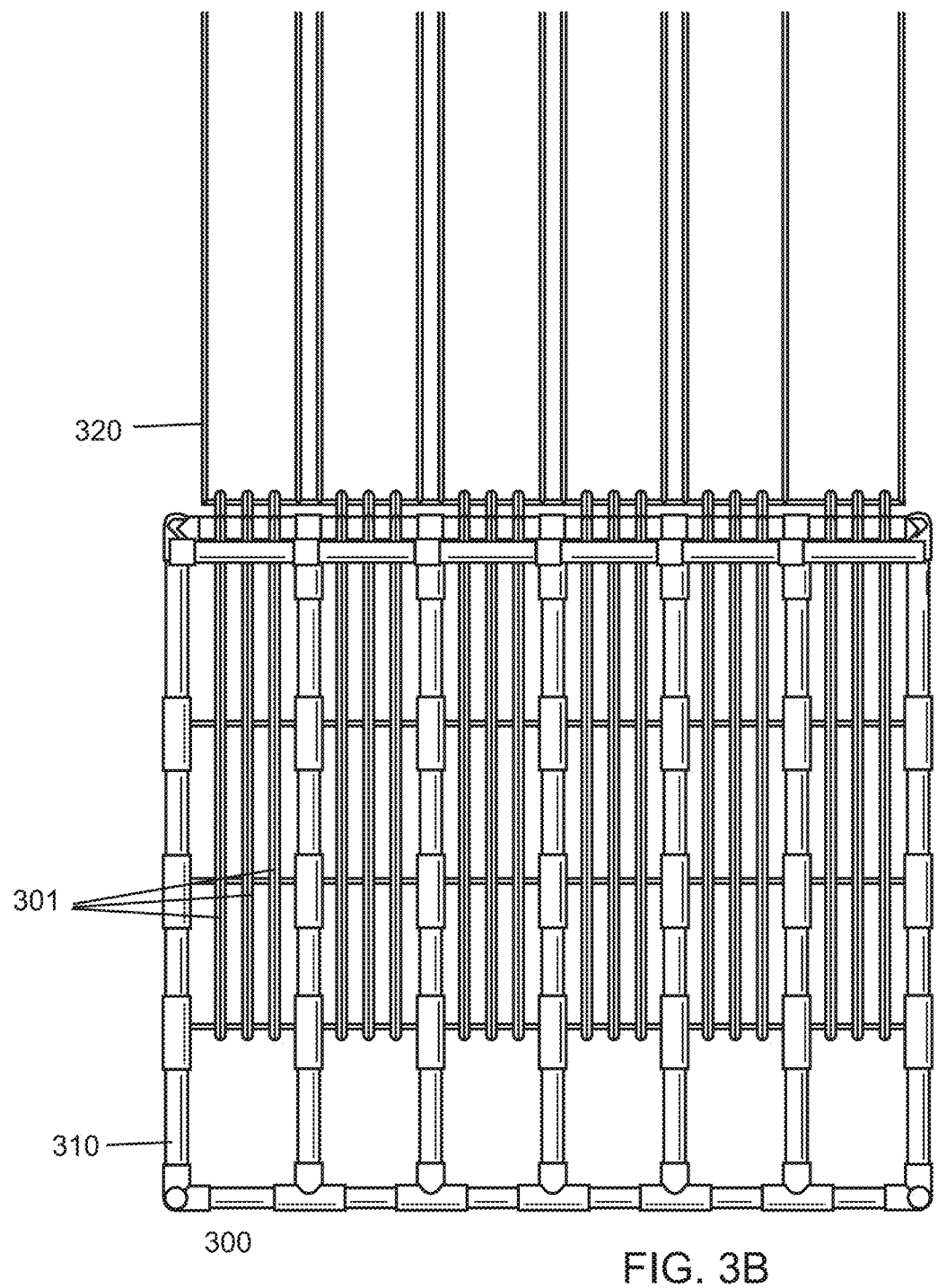
Figure 3C:
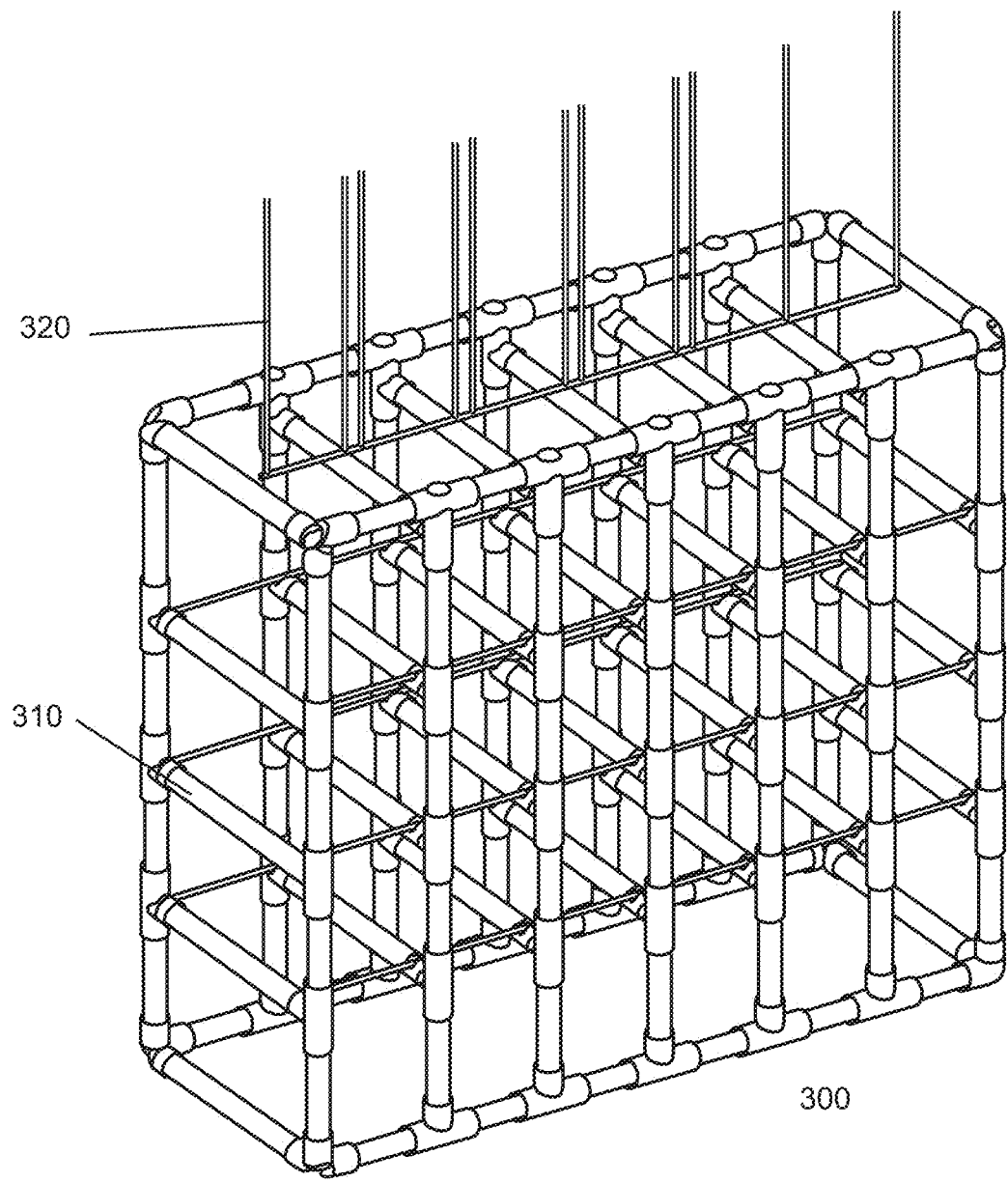
Figure 3D:
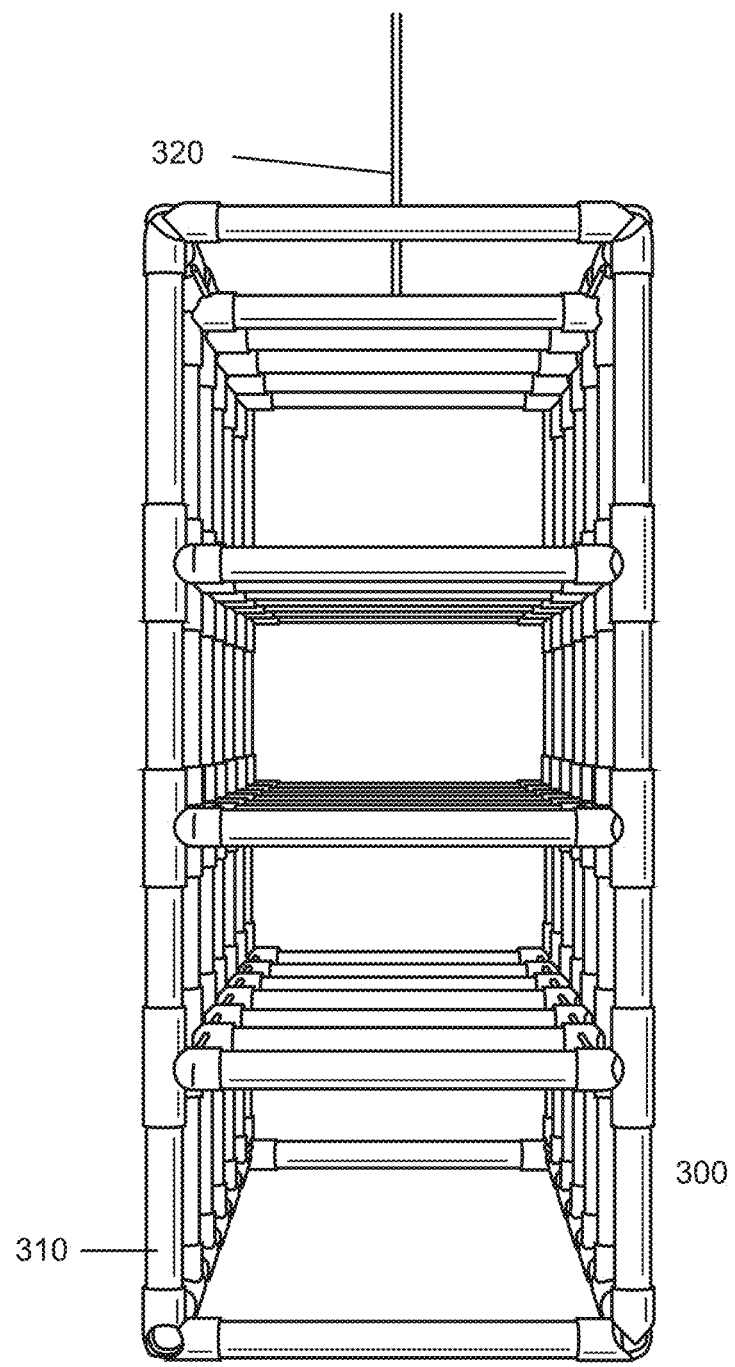

FIG. 2 is a block diagram of a dynamically configurable and controllable wastewater treatment container having a plurality of basin compartments according to an embodiment of the disclosure. In this embodiment, modular basin 200 includes a plurality of wastewater treatment compartments, each executing a specific wastewater treatment function.

In this embodiment, modular basin 200 receives wastewater from an influent source (e.g., a collection system) via headworks pipes 205 into anoxic compartment 210. In some embodiments, at the start of the wastewater purification process there is a requirement to remove all solids larger than a threshold value (e.g., 2 mm in diameter). This phase of treatment may be referred to as "headworks" processing. This processing may be executed in a standalone wastewater treatment container, or incorporated in a multi-function wastewater treatment container.

When anoxic conditions are desired, anoxic compartment 210 may divert air away from the wastewater influent via outlet 211 in order to execute an anoxic process (e.g., de-nitrification of nitrates and nitrites). Modular basin 200 further includes weir 215 disposed between anoxic compartment 210 and aeration compartment 220 (described below). In order for modular basin 200 to execute a plurality of wastewater treatment functions, certain water levels may be maintained in various wastewater treatment processing compartments. It is also desirable to take advantage of "gravity flow" in order to reduce the number of mechanical pumps necessary to move water within the modular basin. Weir 215 may be utilized in embodiments of the invention to address this problem. In one embodiment, weir 215 is an overflow barrier that forms a controlled waterfall to alter the flow characteristics of wastewater transferred from anoxic compartment 210 to aeration compartment 220. In another embodiment, weir 215 is a modified pipe-weir. Said weir may be affixed to one of the interior walls of modular basin 200, and may be lower in height or perforated with holes at the desired water level.

In the illustrated example embodiment, once anoxic compartment 210 is filled, the water overflows into adjacent aeration compartment 220 via weir 215. The wastewater remains at the weir wall height in anoxic compartment 210 in perpetuity, while the water level in aeration compartment 220 fluctuates as a function of the water coming into the anoxic compartment (i.e., wastewater received at input 205 of modular wastewater container 200).

Modular basin 200 further includes aeration (i.e., pre-air) compartment 220 to deliver a suitable amount of air into the wastewater influent received from anoxic compartment 210 to promote aerobic reactions (e.g., a reaction taking place in the presence of oxygen) within the basin via, for example, air bubbles, compressed air streams, or any means to inject air into the wastewater influent. Said aerobic reaction may reduce the biochemical oxygen demand (BOD) and may further nitrify ammonia present in the wastewater influent to nitrate.

In this embodiment, aeration compartment 220 utilizes a mixer and coarse aeration bubble diffusers; aeration is supplied to aeration compartment 220 via positive displacement aeration pumps 221 to pump pipe air to the diffusers.

Weir 225 controls the flow of wastewater influent from aeration compartment 220 to MBR compartment 230. Weir 225 may comprise any embodiment similar to that of weir 215.

MBR compartment 230 executes both bio-reactive treatment processes with membrane separation processes. MBR compartment 230 uses membranes to separate and concentrate the biomass by removing wastewater (as opposed to using settling processes). Furthermore, said MBR compartment may retain particulate matter, remove a high percentage of pathogens, and remove dissolved materials from the wastewater influent.

Membranes utilized by MBR compartment 230 may be of any material (e.g., synthetic or natural) or porosity determined based on system requirements (e.g., quality requirements of the effluent). For example, said MBR compartment may utilize reverse osmosis, nanofiltration, ultrafiltration, microfiltration, or any other solid/liquid separation membranes known in the art. Said membranes may be of any configuration suitable for modular basin 200 (e.g., sheet, hollow tube). In one embodiment, MBR compartment 230 utilizes polypropylene membrane filters comprising 0.4 micrometer pores.

In this embodiment, MBR compartment 230 includes air blowers 231 to provide aeration to the compartment to reduce BOD, convert ammonia to nitrate, and provide air scour to reduce fouling. Sodium hypochlorite may be pumped through the membranes of the compartment to prevent fouling of the membrane filters, and aluminum and magnesium sulfate may be fed into the MBR compartment to neutralize the pH levels of the wastewater influent.

Weir 235 controls the flow of wastewater influent from MBR compartment 230 to WAS compartment 240. Weir 235 may comprise any embodiment similar to that of weirs 215 and 225.

WAS compartment 240 may execute any solids processing means known in the art. In one embodiment, pipe 241 transfers WAS from basin 200 for further processing (e.g., disposal, solids discharging, etc.) via effluent pipe 299.

Control compartment 250 may monitor the operation conditions of the various compartments of basin 200, and may collect and transmit sensor data, manage the operation of the basin, bring the basin online or offline, etc. In this embodiment, liner wall 245 separates control compartment 250 from the wastewater treatment compartments described above.

The modular wastewater treatment basins described above allow for automated WWTP system planning and construction. Each individual basin may be uniformly constructed, stackable, and operable; enabling multiple WWTP system sites to have the same basin configurations, the same hardware, the same power and piping configurations, etc. Thus, a WWTP system site may be planned and designed based on a minimum amount of operating parameters.

As described above, in some embodiments of the invention a modular wastewater treatment container is to include a plurality of basins. Said containers may utilize weirs to form these basins (alternatively referred to herein as "basin components.") In order for a modular wastewater treatment container to include a plurality of basin compartments that separately perform a wastewater treatment function, certain water levels should be maintained in the various compartments. It is also desirable to take advantage of "gravity flow" in order to reduce the number of mechanical pumps necessary to move water around within the modular wastewater treatment container.

Due to the modular capability of container 200, a huge stainless steel MBR frame is impractical to use, in terms of both cost and efficiency. As discussed above, another disadvantage of the stainless steel frame is that it cannot be easily secured inside an ISO based WWTP container that utilizes a liner (e.g., HDPE liner) for basin water integrity. Because of the massive weight for stainless steel, prior art MBR frames typically require anchoring to the floor of a steel or concrete basin. There is no cost effective and failsafe method of securing the steel container through an HDPE or other plastic liner (e.g., said stainless steel MBR frame would easily tear through the HDPE liner if it is at all moved from its affixed position).

FIG. 3A-FIG. 3D illustrate MBR frames according to embodiments of the disclosure. In this example, MBR cartridge 300 is shown to include plurality of membrane cartridges 301 and housing frame 310 comprising a lightweight corrosion resistant material (e.g., non-corrosive metals, non-corrosive composites such as PVC, HDPE and fiberglass reinforced plastic (FRP)). The anti-corrosive properties of said frame allow of it to be re-used (e.g., with replaced MBR filters). In this example, MBR filters 301 are shown to be spaced apart for illustration clarification purposes only; embodiment may include MBR filters in a more densely packed configuration.

Said MBR frame may be used in a multi-function wastewater treatment container having a basin, the basin to include a base, a gravitational top opposite the base, a plurality of side walls, an MBR basin compartment, and (in some embodiments) a second basin compartment executing a different wastewater treatment function. Said container may also include a corrosion resistant liner coupled to interior portions of each of the base and side walls of the basin, an inlet to receive wastewater treatment influent into the basin, and an outlet to output wastewater treatment process material from the basin. In this embodiment, MBR frame 310 is shown to be coupled to hanging rods 320 for installation within a WWTP container.

In some embodiments, MBR frame 310 comprises a lightweight corrosion resistant material (e.g., Poly Vinyl Chloride (PVC) or any functional equivalent). Said MBR frame may be buoyant with respect to the surrounding WWTP influent. In other words, MBR frame 310, even when loaded with plurality of MBR filters 301, may potentially move within the container or sub-compartment due to being buoyant (i.e., having a lower weight density) than the surrounding wastewater material.

In some embodiments, the gravitational top of the host WWTP basin includes a component to restrict vertical movement of MBR frame 310. In some embodiments, the multi-function wastewater treatment container further includes a plurality of pipes to transfer at least one of air and wastewater material between the host MBR compartment and a second compartment, and MBR frame 310 is coupled to the plurality of pipes to restrict horizontal movement of the MBR frame. Thus, in some embodiments, MBR frame 310 is not affixed to the base of the basin. It is understood that prior art MBR frames are too heavy to be safely coupled to WWTP pipes (i.e., said prior art frames would likely damage or displace said pipes).

Figure 4:
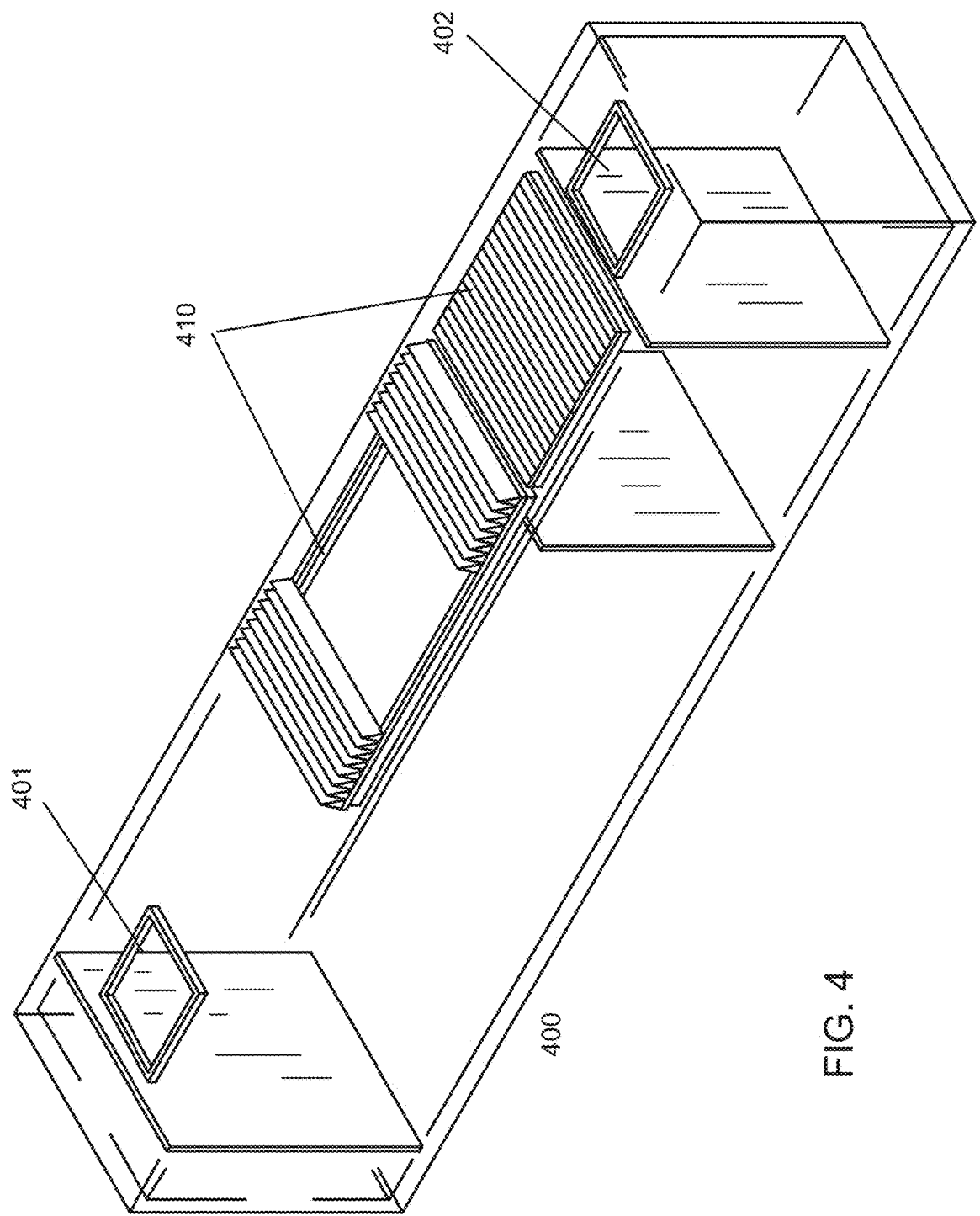
FIG. 4 is a diagram of a dynamically configurable and controllable wastewater treatment container configured to receive modular MBR frames according to an embodiment of the disclosure.

FIG. 4 is a diagram of a dynamically configurable and controllable wastewater treatment container configured to receive modular MBR frames according to an embodiment of the disclosure. In this embodiment, WWTP container 400 includes openings 401 and 402, for which headworks and dewatering structures may be received. Access doors 410 may be used to install modular MBR cartridges for WWTP container 400. Thus, container 400 enables a modular design approach for a WWTP container by subdividing into smaller parts to receive (i.e., to have installed) various WWTP modular components, thereby increasing the efficiency of the manufacture and transport of WWTP solutions.

Figure 5:
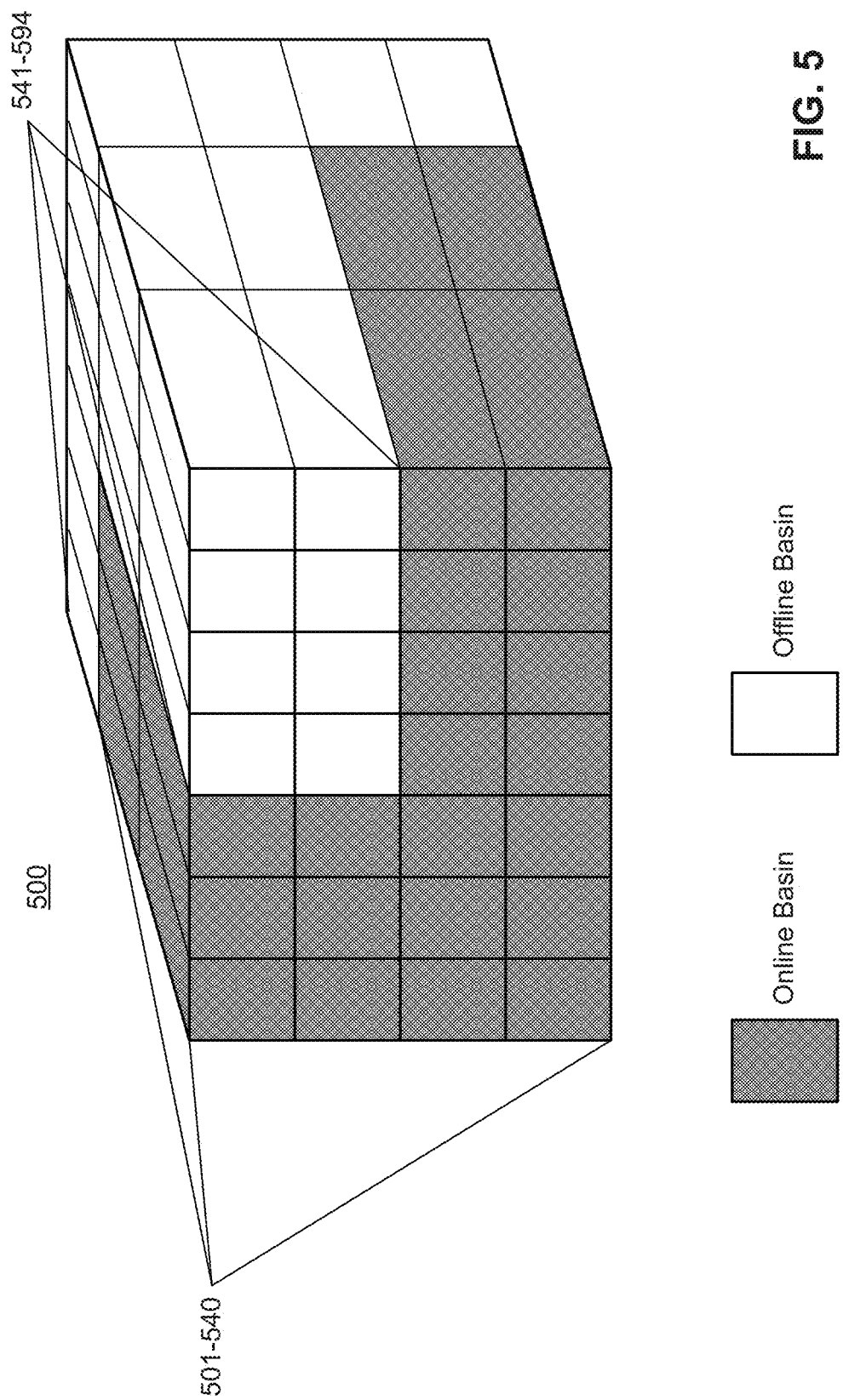
FIG. 5 is a block diagram of a plurality of modular wastewater treatment containers included in a wastewater treatment system according to an embodiment of the disclosure.

FIG. 5 is a block diagram of a plurality of modular wastewater treatment containers included in a wastewater treatment system according to an embodiment of the disclosure. In this embodiment, wastewater treatment system 500 includes plurality of containers 501-594. Said containers may be consistent with ISO specifications for intermodal containers as described above. In some embodiments, containers 501-594 act in concert to perform the same wastewater management function (e.g., containers 501-594 may function together as MBR basins) or functions (e.g., containers 501-594 may each comprise a multi-function WWTP container, such as container 300 of FIG. 3). In other embodiments, said containers may each perform a separate function (e.g., some containers may function as an aeration tank while others containers may function as a membrane/MBR basin), or may each perform a plurality of functions. In some embodiments, containers 501-594 may be utilized to form an entire WWTP, while in other embodiments said containers may augment a prior art wastewater treatment system.

In the illustrated embodiment, containers 501-540 are shown as being in an "online" state; for example, containers 501-540 may be configured to perform the function of an equalization basin, and thus are "online" to receive wastewater input flow for system 500. Containers 541-594 are shown as being in an "offline" state; for example, containers 541-594 are configured so they cannot receive wastewater input flow for system 500. In other words, as illustrated in this example containers 501-594 may represent the potential capacity of system 500, but system 500 has an actual capacity represented by containers 501-540.

In some embodiments, containers 501-594 are brought offline due to MBR cartridge filter operational states (e.g., filters need replacing, are malfunctioning, etc.). Embodiment MBR frames are easily and quickly removed and/or replaced due to their lightweight properties. Thus, in some embodiments, offline containers are brought offline and their WWTP influent is re-routed to online containers executing a similar function until their MBR frames are operational.

A control module or logic may monitor the wastewater input (i.e., influent) flow of system 500, and determine whether the capacity of online containers 501-540 is higher than the input flow; if the input flow is higher, some of offline-basins 541-594 are brought online to increase the operational capacity of system 500. Thus, the expansion of system 500 may be incremental, with no additional construction to the WWTP required. The control module or logic may configure the capacity of system 500 in response to any system level event or operating parameter that may require the operational capacity of system 500 to be increased, such as a significant increase in input flow, changes to the input/output water quality of system 500, a determination that at least one of online containers 501-540 is malfunctioning, overflow/underflow conditions, etc.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A method of manufacturing a frame for a plurality of membrane bioreactor (MBR) cartridges, the method comprising:
   coupling the frame to a supporting arrangement, the supporting arrangement configured to allow installation and removal of the frame via an access door of a wastewater treatment container, the supporting arrangement further configured to restrict vertical movement of the frame within the wastewater treatment container, the frame comprised of a lightweight material such that the frame has a lower weight density than wastewater material into which the frame is placed, the frame configured to not be anchored at an affixed position in the wastewater treatment container such that the frame has vertical movement and horizontal movement within the wastewater treatment container based on the frame being buoyant with respect to the wastewater material.

2. The method of claim 1, wherein the installation component includes hanging rods for allowing the installation and removal of the frame.

3. The method of claim 1, wherein the frame comprises modular compartments such that one or more of the plurality of MBR cartridges may be replaced within the frame upon the removing of the frame from the wastewater treatment container.

4. The method of claim 1, wherein the removal of the frame allows the frame to be swapped with an additional frame.

5. The method of claim 1, wherein the lightweight material comprises at least one of PVC, HDEP, or FRP material.

6. The method of claim 1, wherein the frame is comprised of an anti-corrosive material such that the frame may be reused upon replacement of one or more of the plurality of MBR cartridges.

7. The method of claim 1, wherein the anti-corrosive material is a non-corrosive metal or a non-corrosive composite.

8. A method of treating wastewater, the method comprising:

removably installing a frame for a plurality of membrane bioreactor (MBR) cartridges into a wastewater treatment container via an access door of the wastewater treatment container, the frame comprised of a lightweight material such that the frame has a lower weight density than wastewater material into which the frame is placed, the frame not being anchored at an affixed position in a wastewater treatment container such that the frame has vertical movement and horizontal movement within the wastewater treatment container based on the frame being buoyant with respect to the wastewater material, the frame coupled to an installation component, the installation component configured to allow installation and removal of the frame via the access door of the wastewater treatment container, the installation component further configured to restrict the vertical movement of the frame within the wastewater treatment container.

* * * * *